United States Patent
Yamashita et al.

[11] Patent Number: 5,865,064
[45] Date of Patent: Feb. 2, 1999

[54] BRAKE LEVER STROKE ADJUSTING MECHANISM

[75] Inventors: Kazuhisa Yamashita; Osamu Kariyama, both of Sakai, Japan

[73] Assignee: Shimano Inc., Sakai, Japan

[21] Appl. No.: 753,238

[22] Filed: Nov. 25, 1996

Related U.S. Application Data

[63] Continuation-in-part of Ser. No. 598,578, Feb. 12, 1996.
[51] Int. Cl.$^6$ .................................................. G05G 11/00
[52] U.S. Cl. ............................................ 74/489; 74/502.2
[58] Field of Search ..................................... 74/489, 502.2

[56] References Cited

U.S. PATENT DOCUMENTS

| | | | |
|---|---|---|---|
| 4,611,500 | 9/1986 | Nagano | 74/489 |
| 4,916,967 | 4/1990 | Nakamura | 74/502.2 |
| 5,279,179 | 1/1994 | Yoshigai . | |
| 5,448,927 | 9/1995 | Lumpkin | 74/502.2 |
| 5,515,743 | 5/1996 | Lumpkin | 74/502.2 |
| 5,537,891 | 7/1996 | Nagano et al. | 74/525 |
| 5,575,178 | 11/1996 | Wu | 74/489 |
| 5,660,082 | 8/1997 | Hsieh | 74/502.2 |
| 5,669,268 | 9/1997 | Tsai | 74/489 |

FOREIGN PATENT DOCUMENTS

| | | |
|---|---|---|
| 0 731 019A2 | 9/1996 | European Pat. Off. . |
| 884159 | 4/1943 | France . |
| 59-54388 | 4/1984 | Japan . |
| WO97/27405 | 6/1997 | WIPO . |

*Primary Examiner*—Richard M. Lorence
*Assistant Examiner*—David Fenstermacher
*Attorney, Agent, or Firm*—Shinjyu An Intellectual Property Firm

[57] ABSTRACT

A brake lever arm is mounted to a base member, with the base member fixed to a bicycle handlebar. The lever arm is pivotal about a pivot point on the base. The lever arm includes an adjusting mechanism that adjusts the position of the lever arm when the lever arm is in a brake dis-engaged position. The adjusting mechanism is slideable in grooves in the lever arm such that the adjusting mechanisms may be moved to positions that are differing distances away from the pivot point. The adjusting mechanism includes a contact member that engages a brake cable connected to the lever arm when the lever arm is moved from the brake dis-engaged position toward a brake engagement position. The position of the contact member with respect to the pivot point determines the effect movement of the lever arm has on the cable. In this manner, the adjusting mechanism adjusts the length of the stoke or travel of the lever arm from the brake dis-engaged position to the brake engagement position.

16 Claims, 12 Drawing Sheets

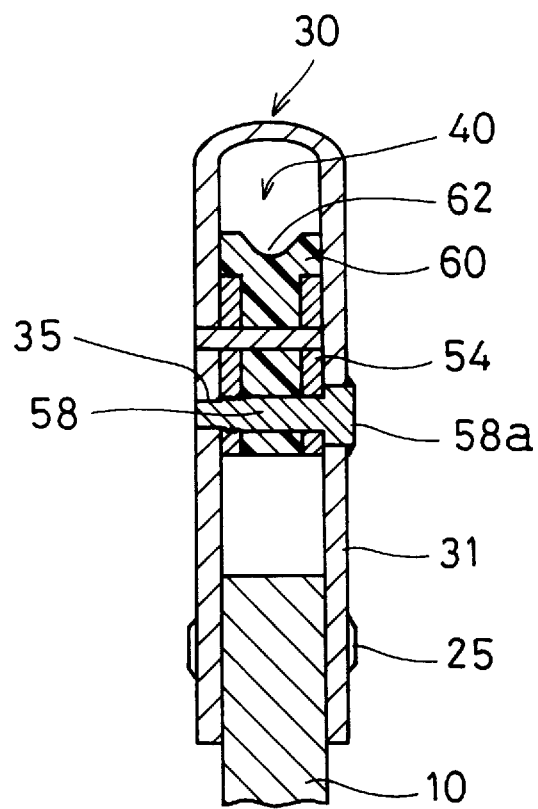

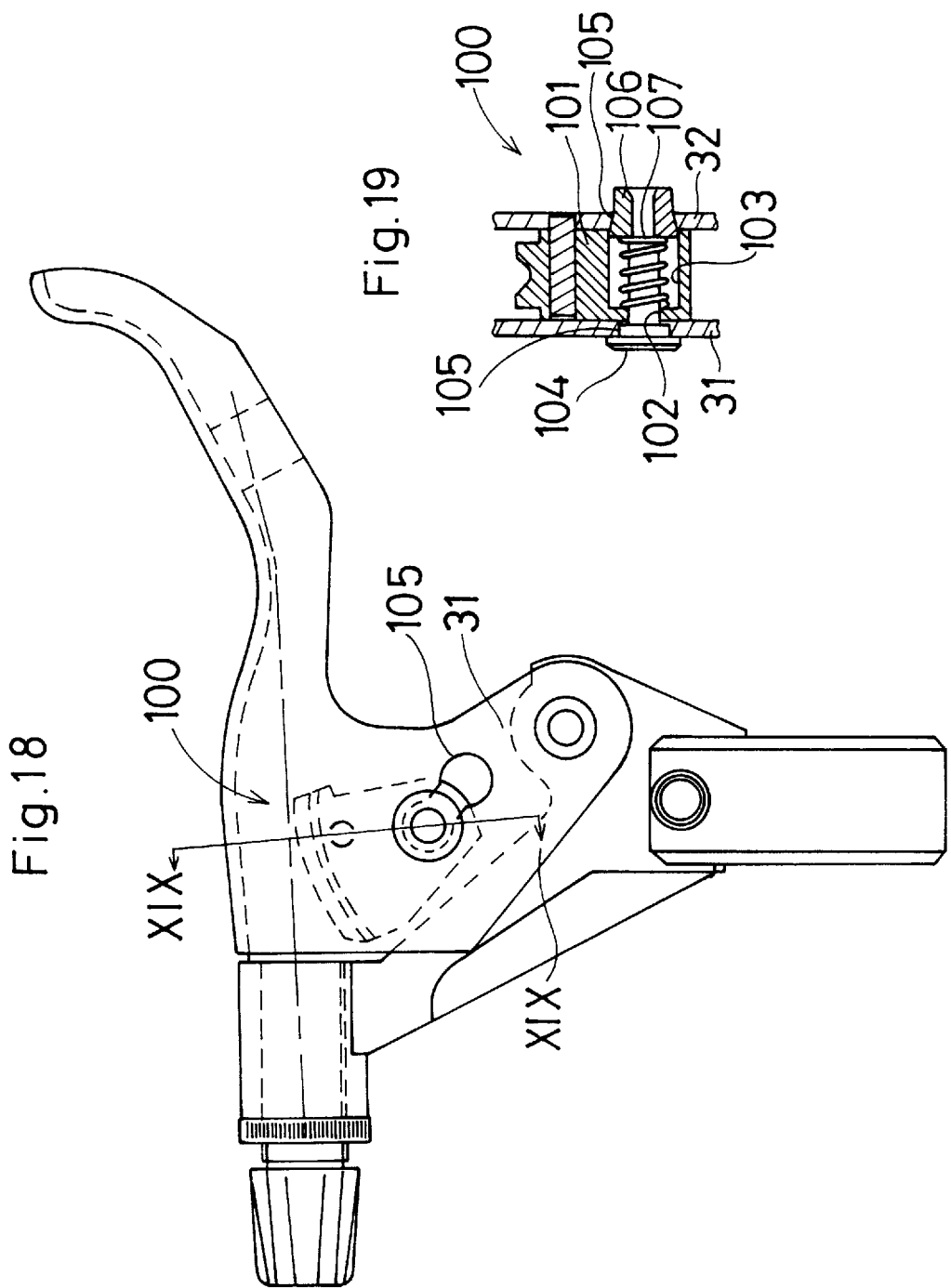

BRAKE LEVER STROKE ADJUSTING MECHANISM

The following application is a continuation in part of currently co-pending U.S. patent application Ser. No. 08/598,578, filed Feb. 12, 1996.

BACKGROUND OF THE INVENTION

A. Field of the Invention

The invention relates to a brake lever arm having an adjusting mechanism therein which adjusts the reach of the brake lever arm and the length of the movement of the brake lever arm.

B. Description of the Related Art

At one time, brake actuating mechanisms for bicycles were merely levers coupled to the handle bar of a bicycle with a cable connected to the lever, the opposite end of the cable being connected to a brake mechanism adjacent to one of the bicycle wheels. However, brake mechanisms and brake actuating mechanisms have become very sophisticated in recent years.

Brake actuating mechanisms usually include a lever arm mounted to a base member for pivotal movement. The base member is typically mounted to a handlebar of a bicycle. A cable extends from the brake mechanism to the lever arm. The lever arm pivots between a brake engagement position and a brake disengagement position. In the brake engagement position, the cable is pulled by the lever arm so that the brake mechanism is engaged to stop tire rotation. In the brake disengagement position, the cable tension is released and the brake mechanism is disengaged. Typically, in the brake disengagement position, the lever arm is spaced apart from the handlebar by a predetermined distance. In the brake engagement position, the lever arm is closer to the handlebar than it is in the brake disengagement position.

Until recently, the lever arm on brake actuation mechanisms were manufactured in accordance with a one size fit all approach. A single generic lever arm was expected to be used by all types of bicyclists. However, the needs of individual bicycle users differs from person to person. For instance, some bicyclists have small hands and some have large hands. Those bicyclists with small hands and short fingers have a short reach and therefore may have difficulty keeping the palm of their hands on a bicycle handlebar grip and reaching the lever arm. Conversely, a bicyclist with large hands may find that his fingers wrap too easily around the lever arm and may not have an optimal engagement with the lever arm.

Recently, brake actuation mechanisms have been introduced which include an adjustment mechanism which allows adjustment of the location of the lever arm when the brake mechanism is in a brake disengagement position. The brake disengagement position adjustment is defined as the reach of a lever arm. Such reach adjustment mechanisms at least allow for some user adjustable features enabling a manufacturer to manufacture one component that may be used by a variety of bicyclists.

Such adjustable lever arms have a sever shortcoming in that the stroke of the lever arm is not adjusted accordingly. The stroke of the lever arm is defined as the total distance the lever arm moves from the brake disengagement position to the brake engagement position. The stroke length may be small or large depending on many things such as the brake mechanism used, how well the brake mechanism is adjusted, the length of the cable, to name a few. Adjustable lever arms appear to fail to provide for the lever arm stroke length. For instance, in the case where the stroke is relatively large and the adjustable lever arm is adjusted to accommodate small hands, the lever arm would be adjusted to be closer to the handlebar in the brake disengagement position. After such an adjustment, the lever arm might contact the handlebar before the brake is engaged causing possible ineffective braking.

SUMMARY OF THE INVENTION

One object of the invention is to provide a brake lever arm with an adjustment mechanism which allows for adjustment of both the reach and the stroke of a bicycle brake lever arm.

In one aspect of the present invention, a brake lever mechanism includes a base member formed with a cable guide and the base member having a pivot point defined thereon spaced apart from the cable guide. A lever arm is formed with a handle portion and a support portion, the support portion mounted for pivotal movement on the pivot point from a brake disengagement position to a brake engagement position, the handle portion formed with a cable engagement portion. An adjusting mechanism is mounted in the support portion, the adjusting mechanism having a cable contact point, wherein the adjusting mechanism adjusts the relative position between the cable contact point and the pivot point. The cable engagement portion and the adjusting mechanism are spaced apart from one another such that a cable extending through the cable guide to the cable engagement portion is selectively engagable with the cable contact point and remains in a space apart relationship with the handle portion of the lever arm with the cable in a tensioned state.

Preferably, the handle portion has a generally semi-circular shape.

Preferably, the adjusting mechanism includes a dial member supported in the support portion of the lever arm and the adjusting mechanism also includes a threaded screw extending from the cable contact point, the threaded screw extending through a central threaded aperture formed in the dial member.

Preferably, when the cable, which extends from the cable guide to the cable engagement portion, is in a tension state the cable is spaced apart from the handle portion of the lever arm providing limited protection for a users hand engaged with the handle portion.

Preferably, the brake lever mechanism further includes a fine adjusting mechanism extending through a portion of the base member for engagement with the support portion, wherein the fine adjusting mechanism adjusts the relative position between the lever arm and the cable guide with the lever arm in the brake dis-engagement position.

Preferably, the brake lever mechanism further includes a fine adjusting mechanism extending through a portion of the base member for engagement with the adjusting mechanism, wherein the fine adjusting mechanism adjusts the relative position between the lever arm and the cable guide with the lever arm in the brake dis-engagement position.

Preferably, the brake lever mechanism further includes a cable hook connected to the cable engagement portion and the cable.

Preferably, the handle portion includes a single finger grip engaging portion.

Preferably, the single finger grip engaging portion has a generally semi-circular shape.

In accordance with another aspect of the present invention, a brake lever mechanism includes a base member formed with a cable guide and the base member having a pivot point defined thereon spaced apart from the cable guide. A lever arm is formed with a handle portion and a support portion, the support portion mounted for pivotal movement on the pivot point from a brake dis-engagement position to a brake engagement position, the handle portion formed with a cable connector. An adjusting mechanism is mounted in the support portion, the adjusting mechanism having a cable contact point, wherein the adjusting mechanism adjusts the relative position between the cable contact point and the pivot point.

Preferably, the adjusting mechanism further includes a body portion with the cable contact point defined on a portion thereon, a dial member supported in the support portion, and a threaded screw extending from proximate the body portion, the threaded screw extending through a central threaded aperture formed in the dial member.

Preferably, the adjusting mechanism further includes a body portion with the cable contact point defined on one portion thereof and a spring biased tapered pin extending through the body portion and through a portion of the support portion, Further, the body portion is moveable from a first position a first distance away from the pivot point to a second position a second distance away from the pivot point in response to depression of the spring biased tapered pin.

Alternatively, the adjusting mechanism further includes a body portion with the cable contact point defined on one portion thereof and a second cable contact point defined on another portion thereof and a pin member extending through an off-center portion of the body portion, the pin member being rigidly attached to the body portion and the pin member further extending though apertures formed in the support portion.

Preferably, the body portion and the pin member are selectively rotatable from a first position to a second position such that:

in the first position the cable contact point is a first distance away from the pivot point; and
in the second position the second cable contact point is a second distance away from the pivot point;
in the first position the cable contact point is configured for engagement with a cable connected to the cable connector in response to movement of the lever arm; and
in the second position the second cable contact point is configured for engagement with the cable in response to movement of the lever arm.

Preferably, the body portion is at least partially made of a plastic material and the cable contact point is defined on the plastic material.

Alternatively, the body portion is formed from metal.

Preferably, the brake lever mechanism includes a fine adjusting mechanism extending through a portion of the base member for engagement with the support portion, wherein the fine adjusting mechanism adjusts the relative position between the lever arm and the cable guide with the lever arm in the brake disengagement position.

Alternatively, the brake lever mechanism includes a fine adjusting mechanism through a portion of the base member for engagement with the adjusting mechanism, wherein the fine adjusting mechanism adjusts the relative position between the lever arm and the cable guide with the lever arm in the brake disengagement position.

These and other objects, features, aspects and advantages of the present invention will become more fully apparent from the following detailed description of the present invention when taken in conjunction with the accompanying drawings where like reference numerals denote corresponding parts throughout, in which:

BRIEF DESCRIPTION OF THE DRAWINGS

FIG. 2 is a section of the brake lever arm taken along the line II—II in FIG. 1A, looking in the direction of the arrow, and shown on a slightly enlarged scale, showing details of an adjusting mechanism disposed within the brake lever arm;

FIG. 4 shows the brake lever arm in a brake disengagement position, FIG. 5 shows the brake lever arm in an intermediate position, and FIG. 6 shows the brake lever arm positioned in engagement with a handlebar grip;

FIG. 7 shows the brake lever arm in a brake disengagement position, FIG. 8 shows the brake lever arm in an intermediate position, and FIG. 9 shows the brake lever arm positioned in engagement with the handlebar grip;

FIG. 10 shows the brake lever arm in a brake disengagement position, FIG. 11 shows the brake lever arm in an intermediate position, and FIG. 12 shows the brake lever arm positioned in engagement with the handlebar grip;

FIG. 18 is a side view of a brake lever arm in accordance with yet another embodiment of the present invention;

FIG. 19 is a fragmentary cross section of the brake lever arm depicted in FIG. 18, taken along the line XIX—XIX in FIG. 19, looking in the direction of the arrows;

DETAILED DESCRIPTION OF THE PREFERRED EMBODIMENTS

Figure 1A:
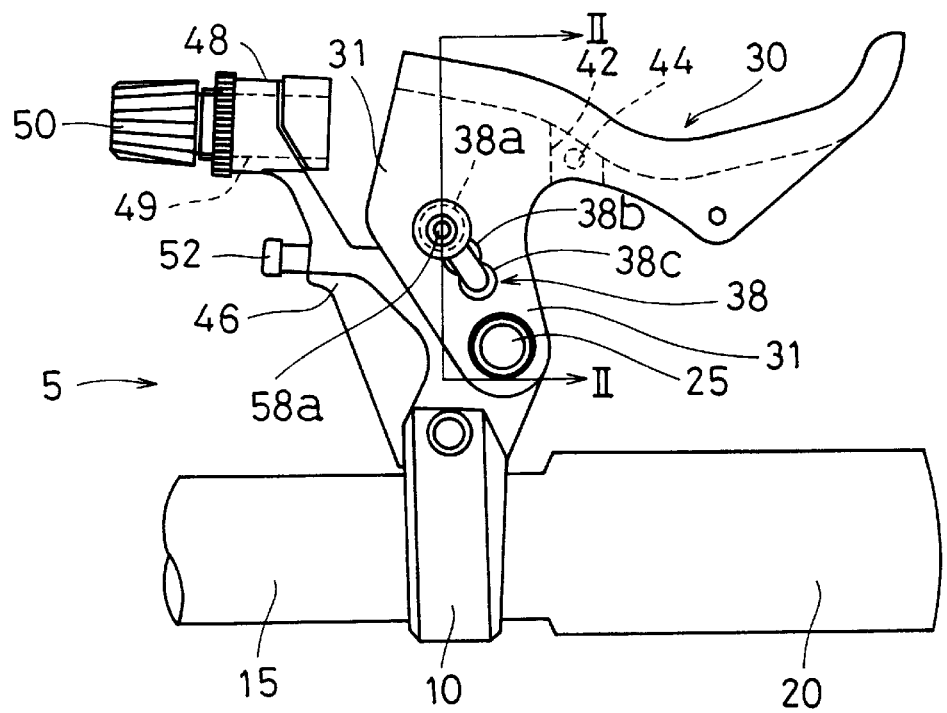
FIG. 1A is a side elevation of a brake lever arm attached to a handlebar in accordance with a first embodiment of the present invention.
Figure 1B:
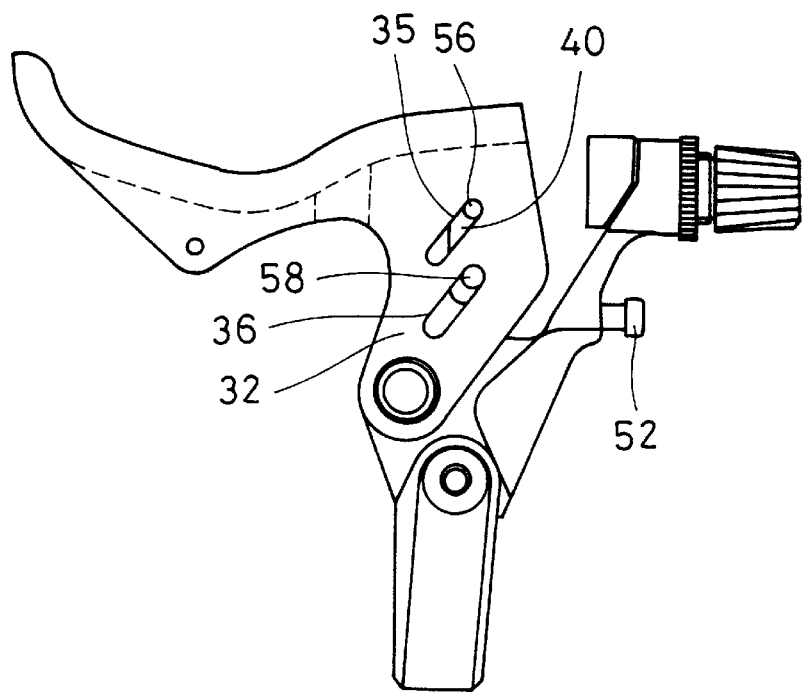
FIG. 1B is a side elevation, similar to FIG. 1, but showing the opposite side of the brake lever arm.

In FIGS. 1A and 1B, there is shown a bicycle brake mechanism 5 that includes a base 10 that is connected to a bicycle handlebar 15. The handlebar 15 also includes a grip 20 to accommodate a bicyclist's hand (not shown). A pivot pin 25 extends through the base 10 and a lever arm 30. The lever arm 30 pivots freely about the pivot pin 25.

The lever arm 30 has a U-shaped cross-section, as shown in FIG. 2. The lever arm 30 is therefore has a generally hollow interior and has generally parallel opposing sides 31 and 32. The side 32 includes a first slot 35 and a third slot 36, as shown in FIG. 1B. The side 31 includes a second slot 38, which has an irregular shape, as will be described in greater detail below. Disposed between the two sides 31 and 32 is an adjusting mechanism 40, which is also described in greater detail below.

The lever arm 30 is also formed with a cable retainer 42 which accommodates and retains the ball end 44 of a cable (not shown in FIGS. 1A and 1B). In FIGS. 1A and 1B the ball end 44 of the cable end is shown but the cable is not shown for greater clarity. The cable C is shown in FIGS. 4–12, and is described in greater detail below.

With reference to FIGS. 1A and 1B, the base 10 also includes an extending portion 46 which has a distal end 48. The distal end 48 is formed with a threaded bore 49 through which a cable adjusting mechanism 50 extends. An adjusting screw 52 extends through the extending portion 46, as is described in greater detail below.

Figure 3A:
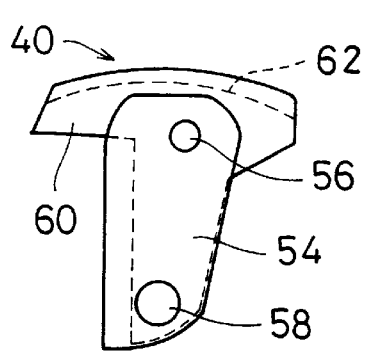
FIGS. 3A, 3B and 3C are views of the adjusting mechanism depicted in FIG. 2, shown removed from the brake lever arm.
Figure 3B:
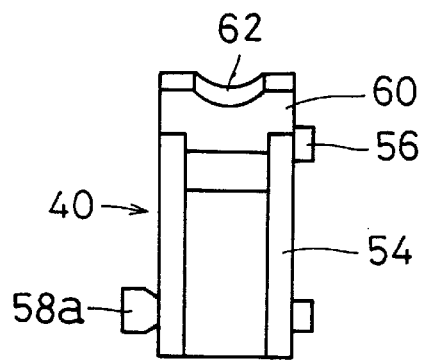
Figure 3C:
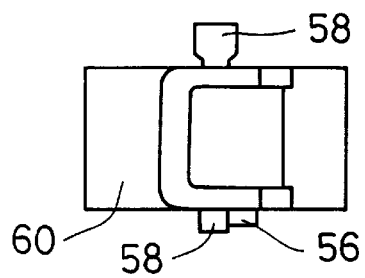

The adjusting mechanism 40 is shown in cross section in FIG. 2, and is also shown removed from the lever arm 30 in FIGS. 3A, 3B and 3C. The adjusting mechanism 40 includes a main body 54 which has a generally U-shape in cross-section, as shown in FIG. 3C. The main body 54 includes a pin 56 extending though holes formed on either side of the main body 54 and a screw 58 also extending though the main body 54, the screw 58 engaging threads formed in the main body 54. The screw 58 also extends through a contact body 60. The pin 56 is fitted tightly within the main body 54 by, for instance, press fitting the pin 56 in holes formed in the main body 54.

The contact body 60 generally has a T-shape, as shown in FIG. 3B, the lower portion 60a of the contact body 60 extending into the interior of the main body 54. The contact body 60, as indicated in FIG. 2, is made of a resin or plastic material. The upper portion of the contact body 60 is formed with a recess 62 that extends the length of the upper portion of the contact body 60.

With the adjusting mechanism 40 disposed within the lever arm 30, the pin 56 extends into the first slot 35 formed in the side 32. Further, the screw 58 extends into the third slot 36 formed in the side 32 and the head 58a of the screw 58 extends through the second slot 38 formed in the side 31. When the screw 58 is loosened, the adjusting mechanism 40 is able to slide freely within the length of the slots 35, 36 and 38.

The adjusting mechanism 40 is configured to move to three positions within the lever arm 30. Correspondingly, the second slot 38 is formed with three rounded sections 38a, 38b and 38c to accommodate a screw head 58a formed on the end of the screw 58. In order to change the position of the adjusting mechanism 40, the screw 58 must be loosened so that the head 58a of the screw 58 extends above the surface of the side 31 of the lever arm 30. With the screw 58 loose, the adjusting mechanism 40 is able to slide within the confines of the first slot 35 and the second slot 38. The screw 58 may be tightened so that the head 58a extends into one of the three rounded sections 38a, 38b or 38c, each of the rounded sections corresponding to the three positions, which are described in greater detail below. It should be appreciated that the second slot 38 may be provided with only two rounded sections or may be formed with four or more rounded sections to provide corresponding numbers of adjustment positions for the adjusting mechanism 40. It should further be appreciated that the screw 58 may be replaced with a spring loaded pin which may be urged by a spring into the rounded sections 38a, 38b or 38c and by pushing on the spring loaded pin, the adjusting mechanism 40 may be moved into a desired position.

FIGS. 4 through 12 depict the present invention in an alternate embodiment where the first slot 35 has also been formed in the side 31 and the pin 56 extends into the first slot 35 formed in the side 31. Further, the cable C connects to the lever arm 30 in an alternate manner.

Figure 7:
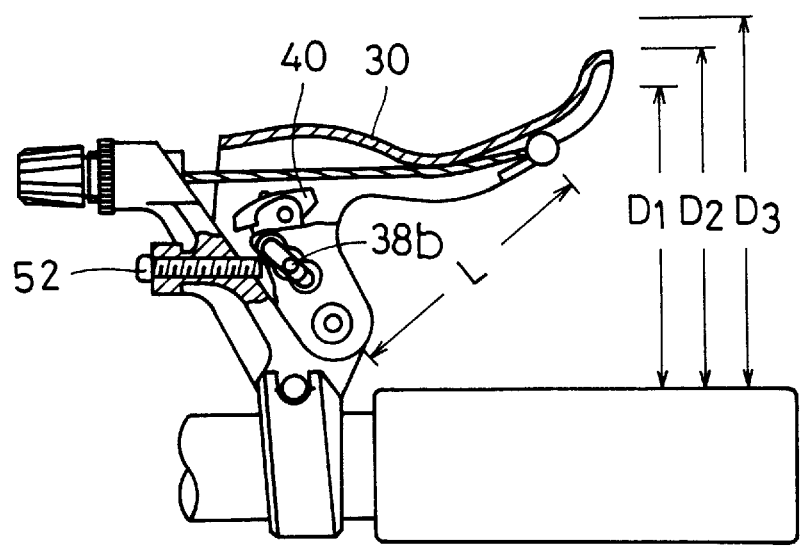
FIGS. 7–9 are fragmentary side elevations, similar to FIGS. 4–6, showing the brake lever arm adjusting mechanism in a second position, where
Figure 8:
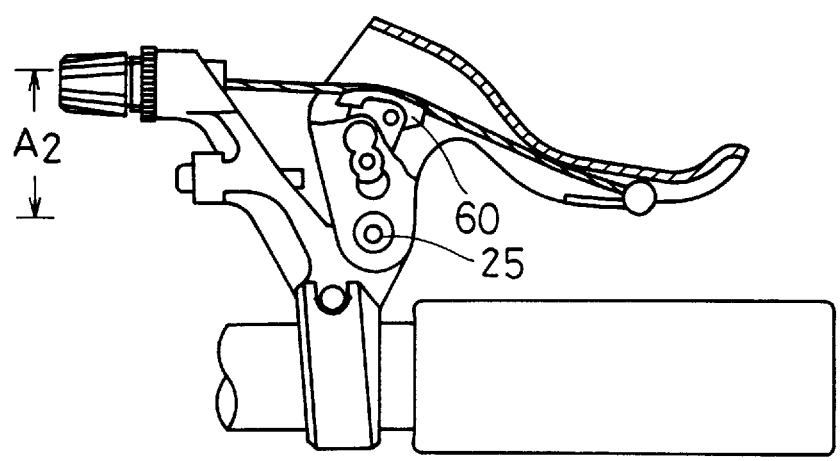
Figure 9:
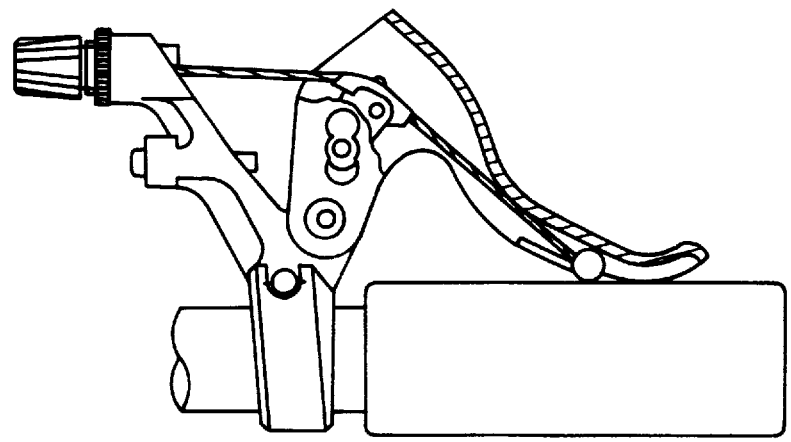
Figure 10:
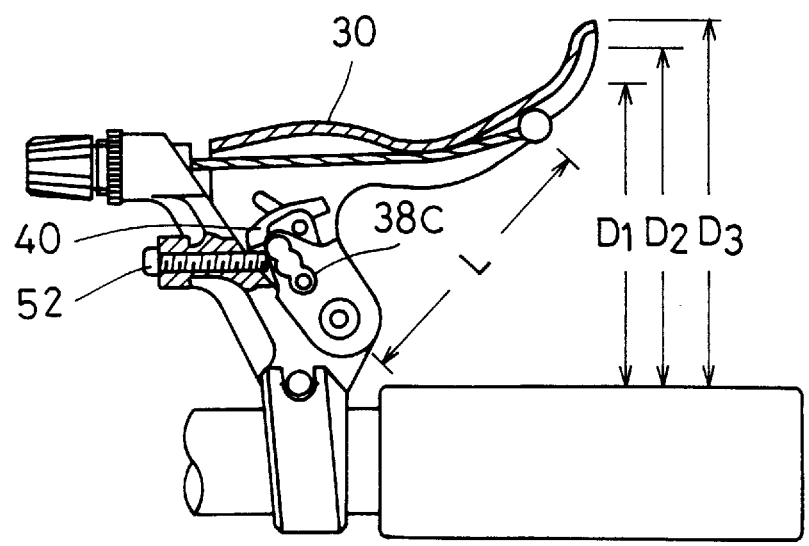
FIGS. 10–12 are fragmentary side elevations, similar to FIGS. 4–6, showing the brake lever arm to adjusting mechanism in a third position, where
Figure 11:
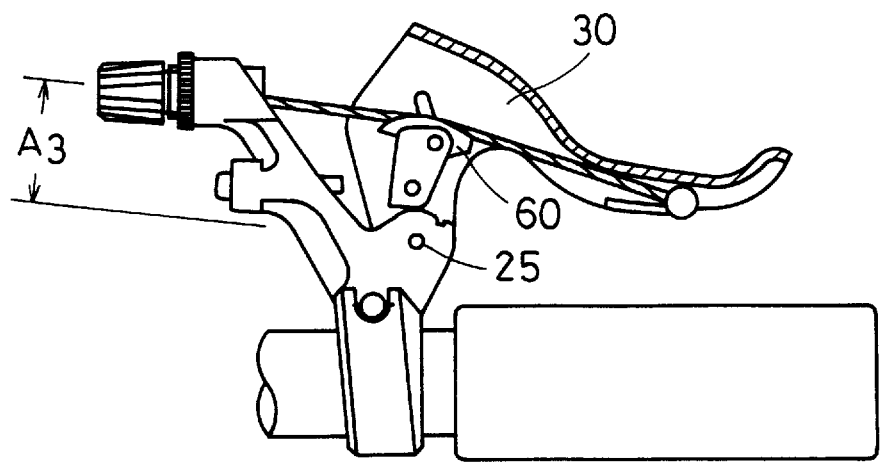
Figure 12:
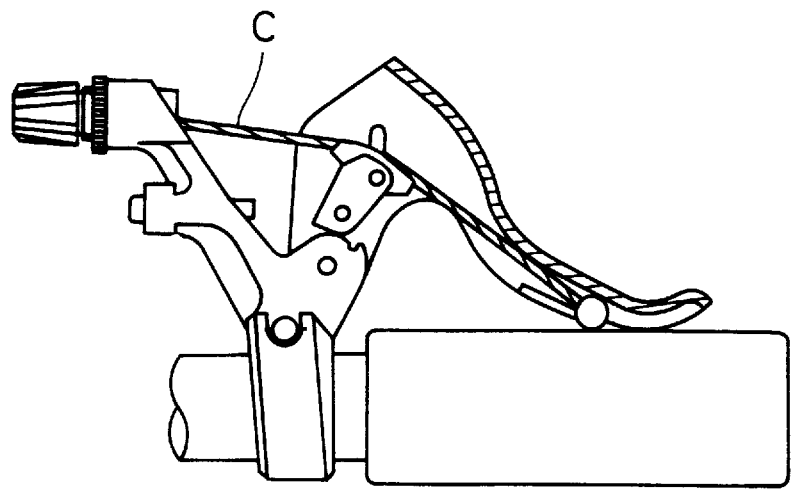
Figure 13:
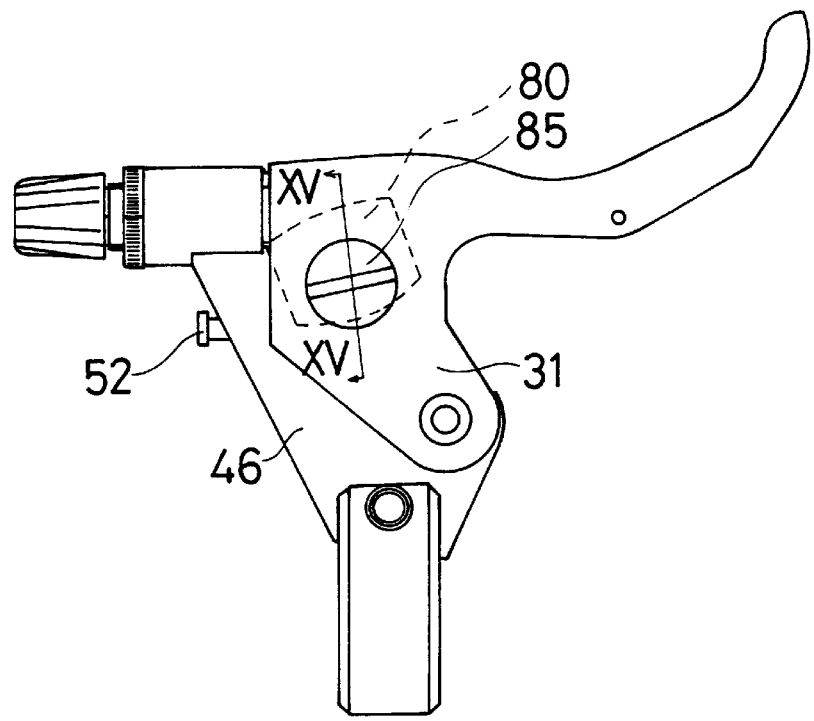
FIG. 13 is a side view of the brake lever arm in accordance with another embodiment of the present invention showing a first side of the brake lever arm.
Figure 14:
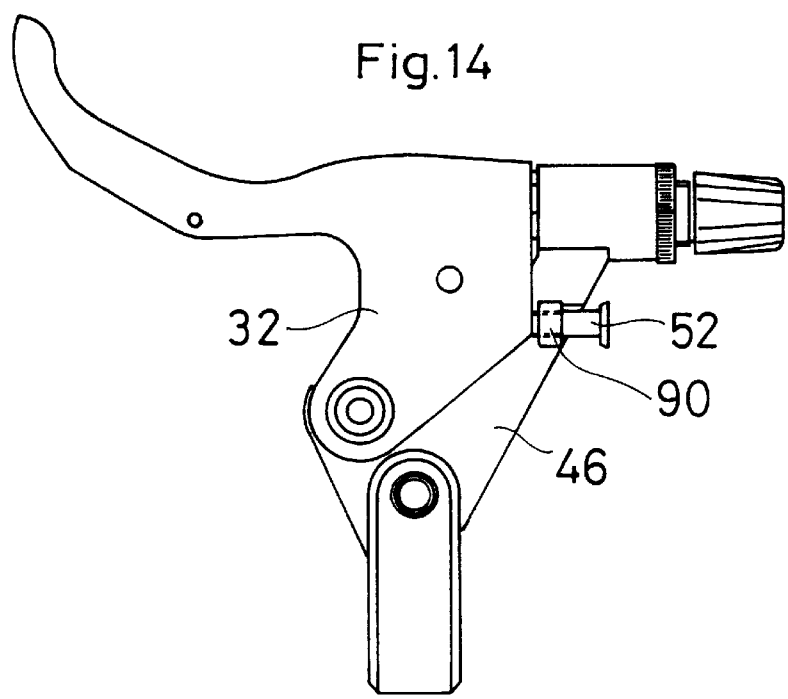
FIG. 14 is a backside view of the brake lever arm shown in FIG. 13, showing the side of the brake lever arm opposite from the side shown in FIG. 13.
Figure 15:
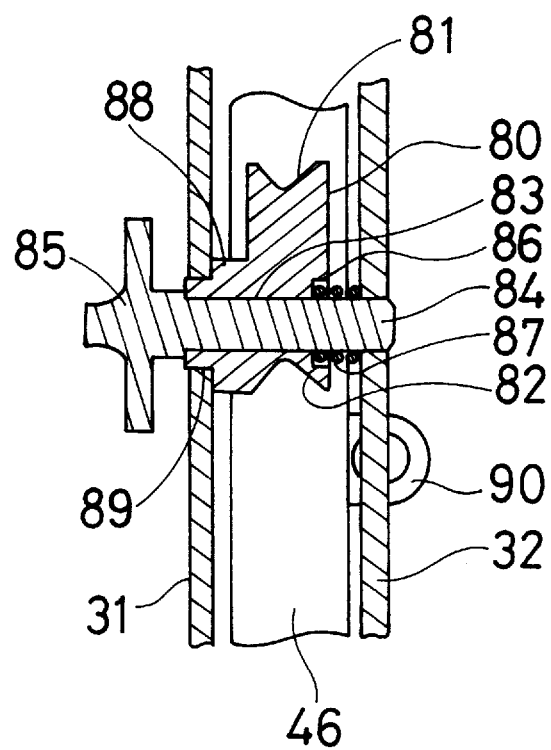
FIG. 15 is a fragmentary cross-section of the brake lever arm depicted in FIGS. 13 and 14, taken along the line XV—XV in FIG. 13, looking in the direction of the arrows, on a slightly enlarged scale.

In FIGS. 4–12, the three positions of the adjusting mechanism 40 are depicted. For instance, in FIGS. 4–6 the adjusting mechanism 40 is shown in a first position with the head 58a disposed in the rounded section 38a. In FIGS. 7–9 the adjusting mechanism 40 is shown in a second position with the head 58a disposed in the rounded section 38b. In FIGS. 10–12 the adjusting mechanism 40 is shown in a third position with the head 58a disposed in the rounded section 38c.

Figure 4:
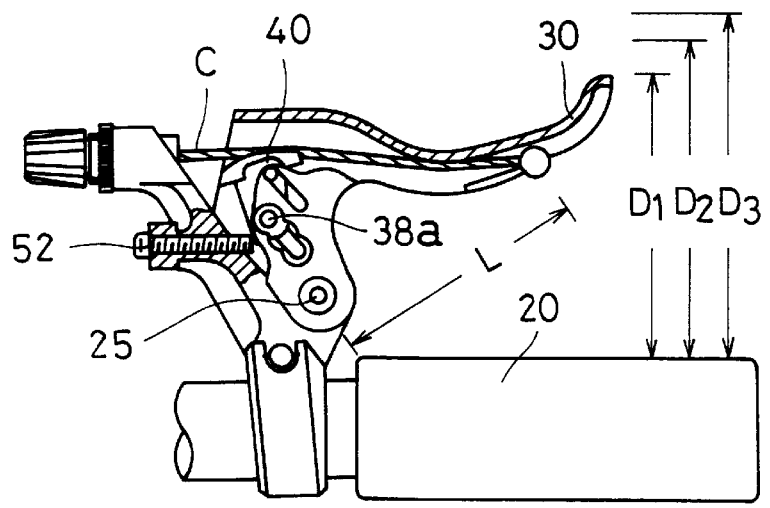
FIGS. 4–6 are fragmentary side elevations with phantom line details showing an alternate embodiment of the brake lever arm depicted in FIGS. 1A, 1B and 2 with the adjusting mechanism in a first position, where

With reference to FIG. 4, various measurements are indicated. FIG. 4 shows the lever arm 30 in a first brake disengagement position where the lever arm 30 is a distance $D_1$ away from the handlebar grip 20. A brake lever arm distance L is defined from the center of the pivot pin 25 to the center of the cable end 44. It should be noted that the brake lever arm distance L is constant throughout all of the various positions depicted in FIGS. 4 through 12.

It should further be noted that for all measurements shown in FIGS. 4 though 12, the adjusting screw 52 is held in a constant position to define the various the brake disengagement positions, described below.

Figure 5:
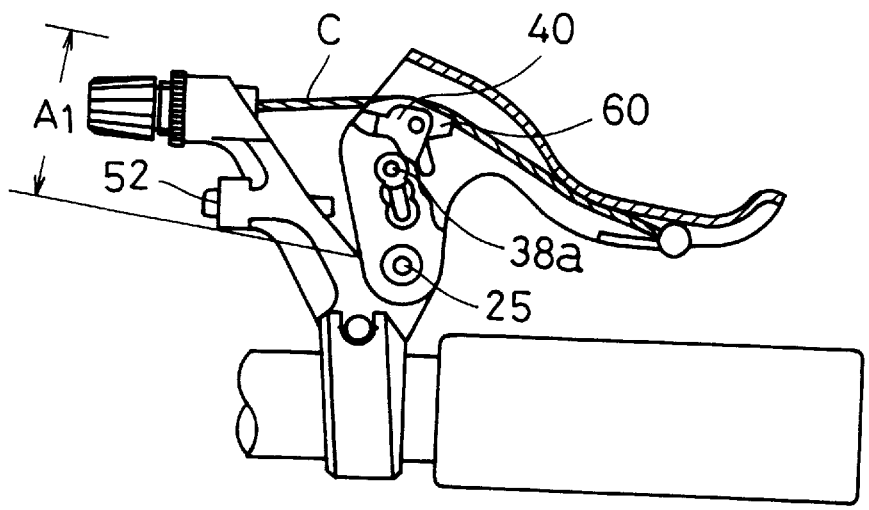
Figure 6:
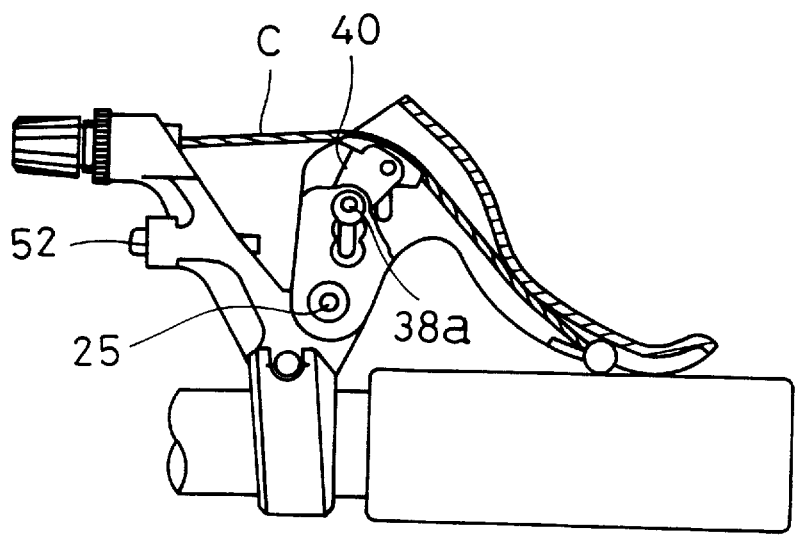

FIG. 5 shows the brake lever arm 30 in an intermediate position between the brake engagement and brake disengagement positions. A first adjustable lever distance $A_1$ is defined from the center of the pivot pin 25 to the recess 62 where the cable C contacts the contact body 60. It should be appreciated that the first adjustable lever distance $A_1$ is constant in FIGS. 4, 5 and 6 where the adjusting mechanism 40 is positioned with the screw head 58a disposed in the first rounded portion 38a of the second slot 38.

FIG. 7 shows the brake lever arm in a second brake disengagement position, where the lever arm 30 is a distance $D_2$ away from the handlebar grip 20 due to the head 58a of the screw 58 being positioned in the second rounded portion 38b of the slot 38.

FIG. 8 shows the brake lever arm in an intermediate position. A second adjustable lever distance $A_2$ is defined from the center of the pivot pin 25 to the recess 62 where the cable C contacts the contact body 60. It should be appreciated that the second adjustable lever distance $A_2$ is constant in FIGS. 7, 8 and 9 where the adjusting mechanism 40 is positioned with the screw head 58a disposed in the second rounded portion 38b of the second slot 38.

FIG. 10 shows the brake lever arm in a third brake disengagement position, with the adjusting mechanism 40 in a third position where the head 58a of the screw 58 is disposed in the third rounded section 38c of the slot 38. In FIG. 10, the lever arm 30 is a distance $D_3$ away from the handlebar grip 20.

FIG. 11 shows the brake lever arm in an intermediate position. A third adjustable lever distance $A_3$ is defined from the center of the pivot pin 25 to the recess 62 where the cable C contacts the contact body 60. It should be appreciated that the third adjustable lever distance $A_3$ is constant in FIGS. 10, 11 and 12 where the adjusting mechanism 40 is positioned with the screw head 58a disposed in the third rounded portion 38c of the second slot 38.

The various positions of the lever arm distance $D_1$, $D_2$, and $D_3$ represent the reach of the lever arm 30.

As is shown in the figures, the following relationships are true:

$A_1 > A_2 > A_3$;

$D_1 < D_2 < D_3$; and

L=constant throughout.

There are several geometrical relationships that are fundamental to the operation of the bicycle brake mechanism 5. First, the reach distance $D_1$, $D_2$ or $D_3$ is easily adjusted by moving the adjusting mechanism 40 into any one of the three rounded sections 38a, 38b or 38c. Adjustment of the reach distance $D_1$, $D_2$ or $D_3$ also alters the stroke length or total movement of the lever arm 30 due to the setting of the adjustable lever distances $A_1$, $A_2$ or $A_3$. The adjustable lever distances alter the stroke length of the lever arm 30 by contacting the cable at a points having differing distances from the pivot pin 25. The movement of the cable C is directly proportional to the size of the adjustable lever distances $A_1$, $A_2$ or $A_3$. Hence, for the reach distance $D_1$, the adjustable lever distance $A_1$ has a relatively large value and therefore, as the lever arm 30 moves, the cable C will move about the pivot pin 25 a corresponding short stroke length until the brake mechanism (not shown) is engaged. For the reach distance $D_2$, the adjustable lever distance $A_2$ has an intermediate value and therefore, as the lever arm 30 moves, the cable C will move about the pivot pin 25 a corresponding intermediate stroke length until the brake mechanism (not shown) is engaged. For the reach distance $D_3$ the adjustable lever distance $A_3$ has a relatively small value and therefore, as the lever arm 30 moves, the cable C will move about the pivot pin 25 a corresponding long stroke length until the brake mechanism (not shown) is engaged.

Comparing the three positions of the adjusting mechanism 40 it is shown in the present invention that as the reach ($D_1$, $D_2$ or $D_3$) gets smaller, the corresponding stroke length also decreases since the distance (either A1, A2 or A3) from the pivot pin 25 increases. Conversely, as the reach ($D_1$, $D_2$ or $D_3$) gets larger, the corresponding stroke length also increases since the distance (either A1, A2 or A3) from the pivot pin 25 decreases.

Also, the brake disengage position distance $D_1$ provides a short reach for a bicyclist, with the lever arm 30 being relatively close to the handlebar grip 20. Similarly, the brake disengage position distance $D_3$ provides a long reach for a bicyclist, with the lever arm 30 being at a relatively large distance from the handlebar grip 20.

The adjusting screw 52 is shown contacting the adjusting mechanism 40. However, alternatively, the adjusting screw 52 may be configured to contact one or both of the sides 31 and 32. The adjusting screw 52 is mounted in the present invention in part to provide for fine adjustment of the reach of the lever arm 30.

Figure 16:
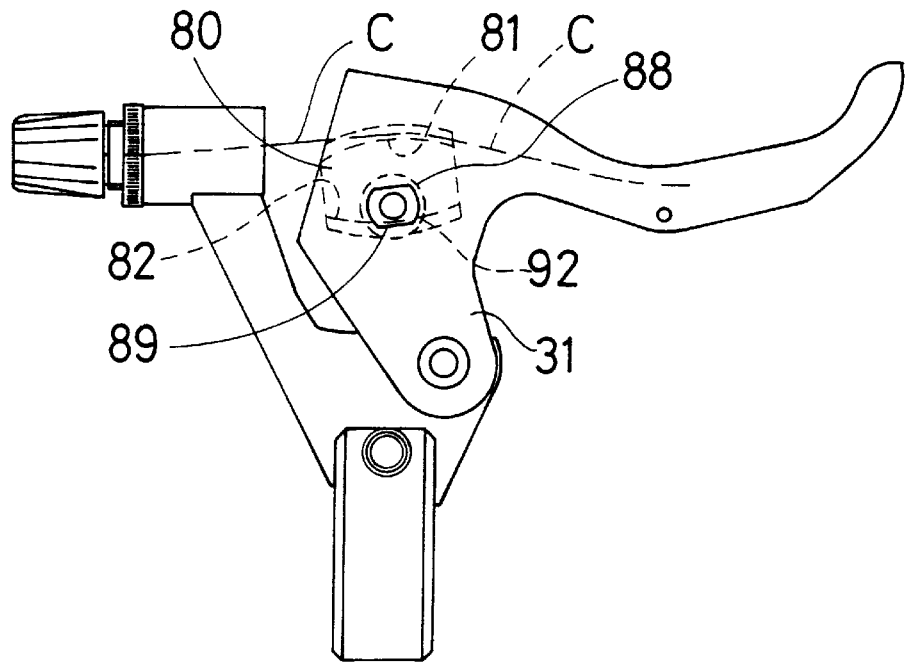
FIGS. 16 and 17 are further views of the brake lever arm depicted in FIGS. 13, 14 and 15, showing an adjusting mechanism (in broken lines) in a first position in FIG. 16 and a second position in FIG. 17.
Figure 17:
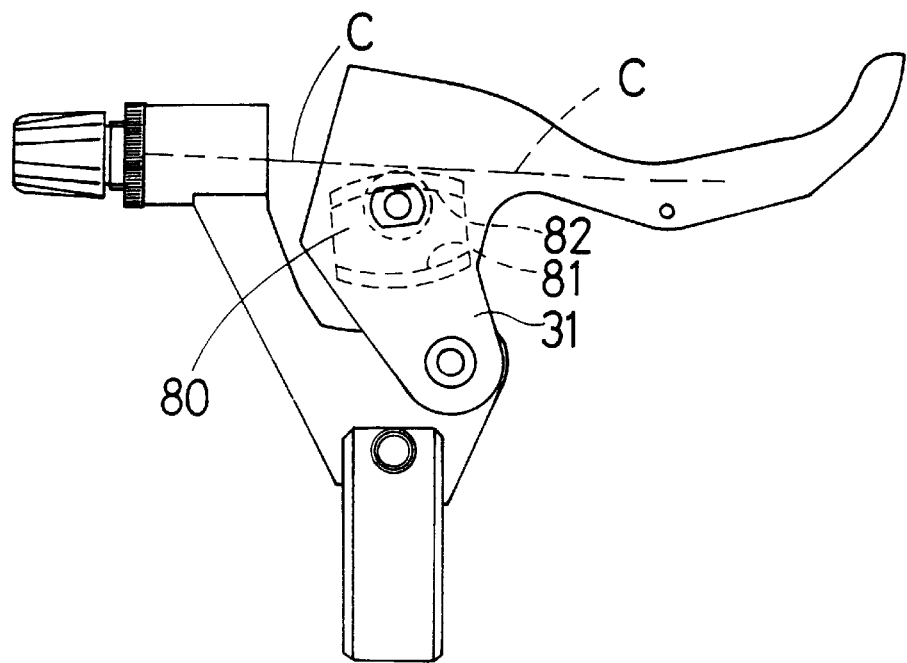

Another embodiment of the present invention is shown in FIGS. 13, 14, 15, 16 and 17. In this embodiment, an adjusting mechanism includes a contact body 80 formed with a first contact portion 81 and a second contact portion 82, shown in FIG. 15. The contact body 80 is formed with an aperture 83 through which a pin 84 extends. The pin 84 is tightly fit in the aperture 83 such that the pin 84 and the contact body 80 rotate together, as is described in greater detail below. The pin 84 is formed with a dial 85. The contact body 80 is also formed with a recess 86 which accommodates a coil spring 87. The contact body 80 also includes a circular portion 88 and a shoulder portion 89. The shoulder portion 89 has a circular shape but includes two generally flat surfaces, as depicted in FIGS. 16 and 17. In FIGS. 16 and 17, the dial 85 and the pin 84 have been removed in order to show the shape of the shoulder portion 89 and an aperture 92. The aperture 92 is formed in the side 31 of the lever arm. The aperture 92 has generally the same shape as the shoulder portion 89.

The extending portion 46 in this embodiment is formed with a flange 90. The flange 90 has an aperture through which the fine adjusting screw 52 extends. The adjusting screw 52 contacts an edge of the side 32 of the lever arm.

In the embodiment depicted in FIGS. 13–17, the adjusting mechanism operates as now described. In order to change the position of the contact point between the cable C the contact body 80, the contact body 80 may be rotated 180° by depressing the dial 85 and rotating it. Pressing the dial 85 causes the contact body 80 to compress the coil spring 87 against the inner surface of the side 32 (see FIG. 15). When the contact body 80 is pressed in this manner, the shoulder portion 89 is pushed out of the aperture 92, thus allowing the dial 85 and the contact body 80 to be rotated. When the contact body 80 is positioned in either of the positions shown in FIGS. 16 or 17, the coil spring 87 urges the shoulder portion 89 into the aperture 90, thus locking the contact body 80 into position. FIGS. 16 and 17 show schematically the effect the positions the contact body 80 may be set to. Further, FIG. 16 shows the first contact portion 81 contacting the cable C. FIG. 17 shows the second contact portion 82 contacting the cable C. Thus rotation of the contact body 80 in this embodiment changes the distance between the pivot point of the lever arm and the contact point of the contact body 80.

In the embodiment depicted in FIGS. 13–17, the contact body 80 is shown as being made of metal. However, it should be understood that the contact body 80 may be made of a plastic or resin material or combinations of plastic and metal materials. Further, it should be appreciated that more that two contact portions could easily be formed on the contact body 80. For instance, three or four contact portions could be formed on the contact body 80.

FIGS. 18 and 19 depict yet another embodiment of the present invention where an adjusting mechanism 100 includes a contact body 101 having an aperture 102 and a recess 103 formed therein. A pin 104 extends through the aperture 102 and the recess 103 and also through generally similarly shaped openings 105 formed in the sides 31 and 32 of the lever arm. The openings 105 include two large portions, as depicted in FIG. 18. Due to the shape of the end of the pin 104, part of the opening 105 is shown in dashed lines in FIG. 10.

One end of the pin 104 is force fitted into a cylindrically shaped cap 106 which has a generally tapered outer surface, as shown in FIG. 19. The cap 106 and the recess 103 confine a coil spring 107 therebetween.

The adjusting mechanism 100 operates as follows. When the cap 106 is depressed, the coil spring 107 is compressed within the recess 103. Due to the tapered shape of the outer surface of the cap 106, once the cap 106 has been depressed, it may be moved back and forth between the two portions of the opening 105. Similarly, the opposite end of the pin 104 may also be moved therewith. In this manner the adjusting mechanism may be moved between at least two positions corresponding to the shape of the openings 105. In FIG. 18, the adjusting mechanism 100 is shown in an outer position, generally corresponding to the position of the adjusting mechanism 38 depicted in FIGS. 1A, 4, 5 and 6 of the first embodiment. In FIG. 18, the opening 105 is such that only two positions of the adjusting mechanism 100 are possible. However it should be appreciated that the opening 105 could easily be made similar to the slot 38 depicted in FIG. 1A to make it possible to position the adjusting mechanism 100 in more than two positions.

Figure 20:
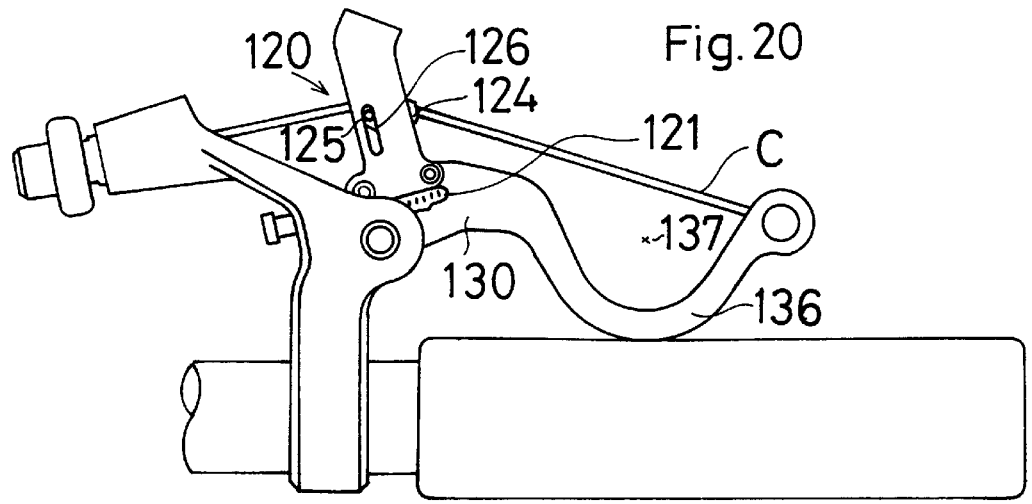
FIG. 20 is a fragmentary side view of still another embodiment of a brake lever arm in accordance with the present invention, showing an adjusting mechanism in one position.
Figure 21:
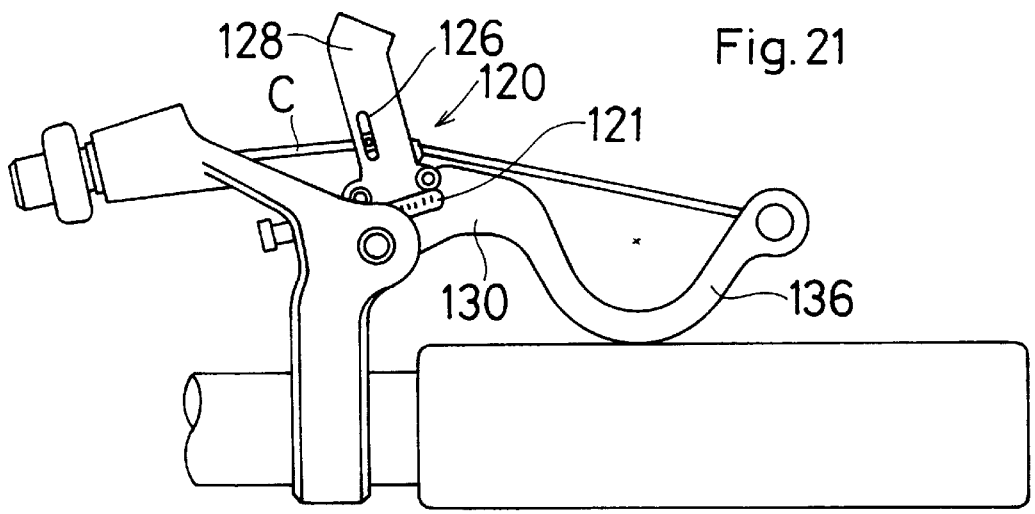
FIG. 21 is a fragmentary side view of the embodiment of a brake lever arm depicted in FIG. 20, showing the adjusting mechanism in another position.
Figure 22:
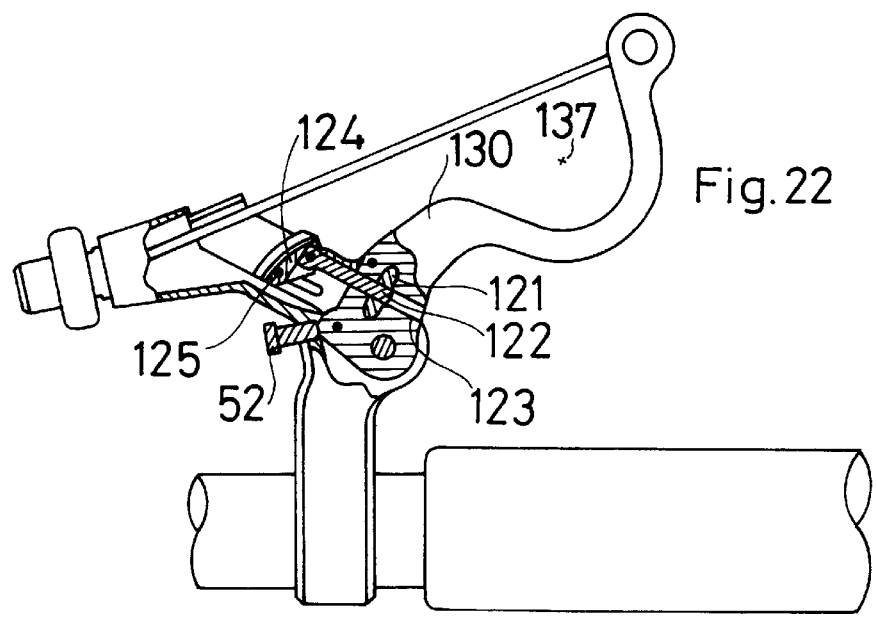
FIG. 22 is a fragmentary, part cross-sectional view, part elevational view of the brake lever arm depicted in FIGS. 20 and 21, showing details of the adjusting mechanism.

FIGS. 20, 21 and 22 show yet another embodiment of the present invention. In the embodiment shown in FIGS. 20, 21 and 22, an adjusting mechanism 120 includes a dial 121 having a central threaded aperture through which a threaded pin 122 extends. The threaded pin 122 extends into an aperture 123 formed in the lever arm 130. The threaded pin 122 is free to move within the aperture 123 but its movement is confined by engagement with the threaded aperture formed in the dial 121. The dial 121 is disposed in a slot formed in the lever arm 130.

The threaded pin 122 is connected to a contact body 124 by, for instance a pin. The contact body 124 is disposed within an extending member 128 which is fixed to the lever arm 130. The extending member 128 is formed with two generally parallel slots 126. A pin 125 extends through the contact body 124 and the slots 126 to guide movement of the contact body 124 within the extending member 128.

The adjusting mechanism 120 operates generally as follows. In order to adjust the position of the contact body 124, the dial 121 may be rotated. Rotation of the dial 121 causes movement of the threaded pin 122 within the aperture 123. Movement of the threaded pin 122 in turn causes movement of the contact body 124.

As shown in FIGS. 20–22, the lever arm 130 has a semi-circular handle portion 136 having a center point 137 which is positioned between the handle portion 136 and the cable C. Due to the shape of the handle portion 136, the cable C provides limited protection against debris possibly hitting a hand or finger grasping the handle portion 136. Preferably, the handle portion 136 is sized to accommodate one finger, although larger sizes are within the scope of the invention.

It should be appreciated that the contact body 124 could be made from any of a variety of materials, such as metal, plastic or combinations thereof.

There are numerous advantages in the present invention. For instance, the present invention provides a simple and easy way to adjust the reach of a lever arm. The present invention also provides a simple and easy way to adjust the stroke length of a lever arm. The present invention provides a simple and easy means for simultaneously adjusting both the reach and the stroke of a lever arm.

The present invention also provides a means for fine adjusting a lever arm into a brake disengage position to accommodate various sized bicyclists with differing size hands.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A brake lever mechanism comprising:
    a base member formed with a cable guide and said base member having a pivot point defined thereon spaced apart from said cable guide;
    a lever arm formed with a handle portion and a support portion, said support portion mounted for pivotal movement on said pivot point from a brake dis-engagement position to a brake engagement position such that in the brake dis-engagement position said support portion extends along side a portion of said base member from said pivot point and slightly beyond said cable guide, said handle portion extending in a direction generally perpendicular from said support portion away from said cable guide, said handle portion further being formed with a cable connector proximate a distal end of said handle portion; and
    an adjusting mechanism mounted in said support portion, said adjusting mechanism having a cable contact point, said adjusting mechanism being configured to adjust the relative position between said cable contact point and said pivot point, said cable contact point extending into a portion of said handle portion between said cable guide and said cable connector.

2. The brake lever mechanism as in claim 1, wherein said adjusting mechanism further comprises:
    a body portion with said cable contact point defined on a portion thereon;
    a dial member supported in said support portion; and
    a threaded screw extending from proximate said body portion, said threaded screw extending through a central threaded aperture formed in said dial member.

3. The brake lever mechanism as in claim 2, wherein said body portion is at least partially made of a plastic material and said cable contact point is defined on said plastic material.

4. The brake lever mechanism as in claim 2, wherein said body portion is formed from metal.

5. The brake lever mechanism as in claim 1, wherein said adjusting mechanism further comprises:
    a body portion with said cable contact point defined on one portion thereof;
    a spring biased tapered pin extending through said body portion and through a portion of said support portion; and wherein
    said body portion is moveable from a first position a first distance away from said pivot point to a second position a second distance away from said pivot point in response to depression of said spring biased tapered pin.

6. The brake lever mechanism as in claim 5, wherein said body portion is at least partially made of a plastic material and said cable contact point is defined on said plastic material.

7. The brake lever mechanism as in claim 5, wherein said body portion is formed from metal.

8. The brake lever mechanism as in claim 1, wherein said adjusting mechanism further comprises:
    a body portion with said cable contact point defined on one portion thereof and a second cable contact point defined on another portion thereof; and
    a pin member extending through an off-center portion of said body portion, said pin member being rigidly attached to said body portion and said pin member further extending though apertures formed in said support portion.

9. The brake lever mechanism as in claim 8, wherein said body portion is formed from metal.

10. The brake lever mechanism as in claim 8, wherein said body portion and said pin member are selectively rotatable from a first position to a second position such that:

in said first position said cable contact point is a first distance away from said pivot point;

in said second position said second cable contact point is a second distance away from said pivot point;

in said first position said cable contact point is configured for engagement with a cable connected to said cable connector in response to movement of said lever arm; and in said second position said second cable contact point is configured for engagement with said cable in response to movement of said lever arm.

11. The brake lever mechanism as in claim 8, wherein said body portion is at least partially made of a plastic material and said cable contact point is defined on said plastic material.

12. The brake lever mechanism as in claim 1, further comprising a fine adjusting mechanism extending through a portion of said base member for engagement with said support portion, wherein said fine adjusting mechanism adjusts the relative position between said lever arm and said cable guide with said lever arm in said brake disengagement position.

13. The brake lever mechanism as in claim 1, further comprising a fine adjusting mechanism extending through a portion of said base member for engagement with said adjusting mechanism, wherein said fine adjusting mechanism adjusts the relative position between said lever arm and said cable guide with said lever arm in said brake disengagement position.

14. A brake lever mechanism, comprising:

a base member formed with a cable guide and said base member having a pivot point defined thereon spaced apart from said cable guide;

a lever arm formed with a handle portion and a support portion, said support portion mounted for pivotal movement on said pivot point from a brake disengagement position to a brake engagement position, said handle portion formed with a cable connector; and an adjusting mechanism mounted in said support portion, said adjusting mechanism having a cable contact point, said adjusting mechanism being configured to adjust the relative position between said cable contact point and said pivot point, said adjusting mechanism having:

a body portion with said cable contact point defined on one portion thereof;

a spring biased tapered pin extending through said body portion and through a portion of said support portion; and wherein said body portion is moveable from a first position a first distance away from said pivot point to a second position a second distance away from said pivot point in response to depression of said spring biased tapered pin.

15. The brake lever mechanism as in claim 14, wherein said body portion is at least partially made of a plastic material and said cable contact point is defined on said plastic material.

16. The brake lever mechanism as in claim 14, wherein said body portion is formed from metal.

* * * * *